Feb. 16, 1965 R. C. HUDSON 3,170,091
ELECTRICAL STRUCTURES
Filed Jan. 11, 1962 2 Sheets-Sheet 1

INVENTOR:
ROBERT C. HUDSON,
BY David M. Schiller
ATTORNEY.

Feb. 16, 1965  R. C. HUDSON  3,170,091
ELECTRICAL STRUCTURES
Filed Jan. 11, 1962  2 Sheets-Sheet 2
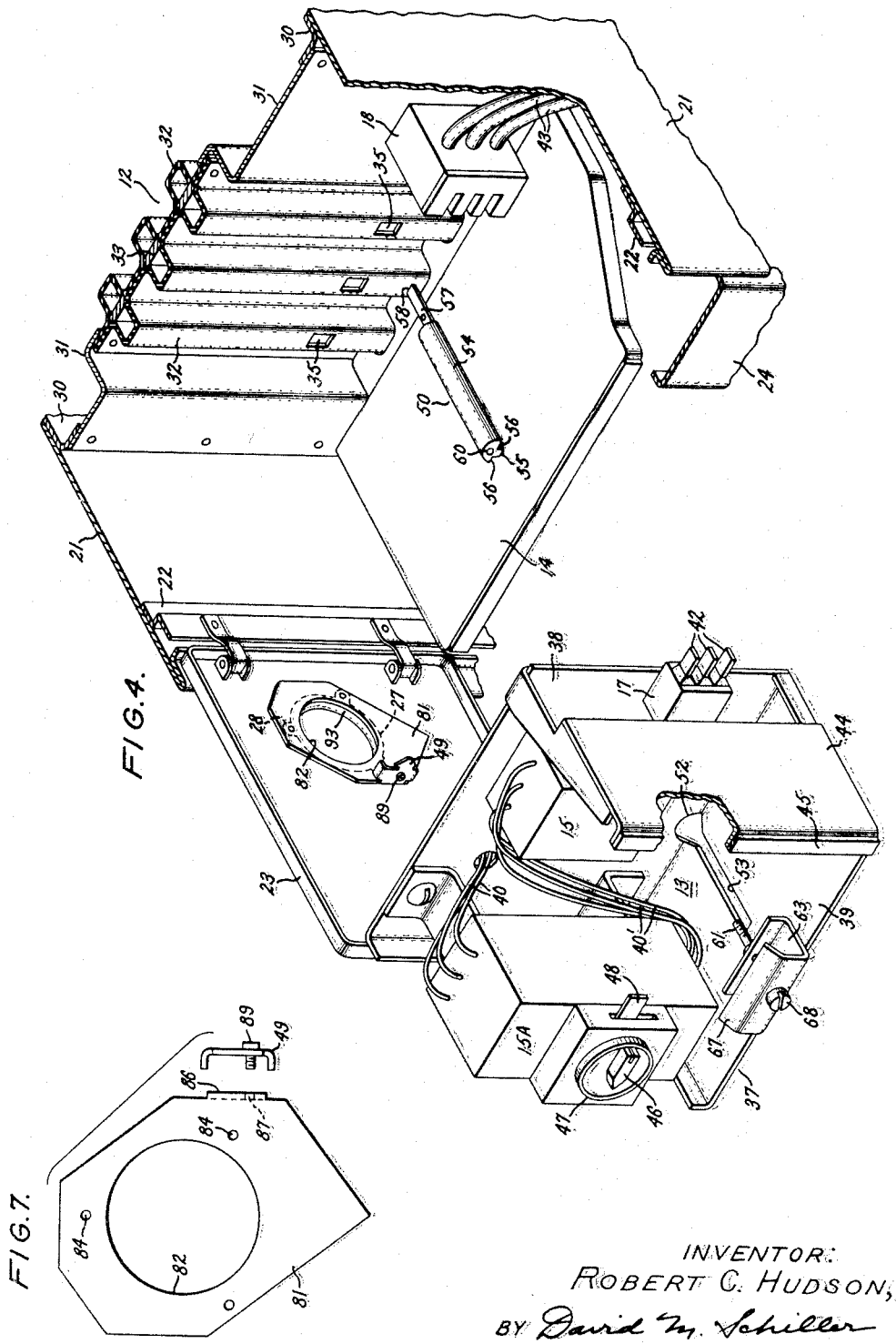
INVENTOR:
ROBERT C. HUDSON,
BY David M. Schiller
ATTORNEY.

United States Patent Office 3,170,091
Patented Feb. 16, 1965

3,170,091
ELECTRICAL STRUCTURES
Robert C. Hudson, Granada Hills, Calif., assignor to General Electric Company, a corporation of New York
Filed Jan. 11, 1962, Ser. No. 165,606
9 Claims. (Cl. 317—119)

This invention relates to electrical structures and more particularly to control centers including control units adapted for insertion and withdrawal into and out of a housing for electrical connection to and disconnection from bus bars contained in the housing.

Control centers have previously been constructed which include a housing having a front door closing a compartment which contains bus bars and means for supporting control units which mount control devices and which are slidable into and out of the compartment for electrical connection to and disconnection from the bus bars. In control centers of this type problems arise in obtaining accurate relative positioning between cooperating parts on the housing door and on the control unit so that the parts assume a desired relationship when the unit is inserted and the door is closed. These problems are particularly troublesome when the control center incorporates means for aligning and locking the control unit relative to the bus bars so that contacts carried by the control unit and connected to the devices thereon may be positively moved into engagement with the bus bars and firmly locked in fixed position in the compartment. A control unit of the type above-described having a very effective aligning and locking system is disclosed in application Serial No. 137,907 filed September 13, 1961 by William F. Olashaw, entitled "Electrical Structures" and assigned to the same assignee as the present invention.

Such positioning problems are encountered, for example, in installations wherein the control units mount manually actuatable switches having an interlock member engageable with a catch on the door when the door is closed to prevent opening of the door when the switch is "on." It is very necessary in such installations that the interlock member and the door catch be accurately positioned with respect to each other when the door is closed so that the interlock member will be moved into positive latching engagement with the catch when the switch is subsequently turned "on." A further problem exists in accurately aligning an opening in the door with an extension of the switch which is adapted to project through such opening when the door is closed. Such extension may, for example, comprise a handle for operating the switch and an escutcheon ring surrounding the handle. These positioning problems are particularly acute in installations incorporating unit aligning and locking means for the reason that such aligning and locking means operate to predetermine the position of the control unit and the switch thereon relative to the bus bars in the housing so that tolerance accumulations can result in misalignment between the interlock member of the switch and the door catch, and also between the switch extension and the door opening.

It is accordingly a primary object of the present invention to provide an electrical structure including a housing having a door and a control unit to be inserted and withdrawn into and out of the housing with novel and improved means for effecting accurate relative positioning between parts on the control unit and on the housing door to permit cooperation of the parts when the door is closed.

It is another object of the invention to provide an electrical structure including a housing having a door and a control unit to be inserted and withdrawn into and out of the housing with novel and improved means for adjusting a part on the housing door relative to a part on the control unit for correcting any misalignment between the parts to permit cooperation of the parts when the door is closed.

It is a further object of the invention to provide an electrical structure including a housing having a door and a control unit having a switch to be inserted and withdrawn into and out of the housing with novel and improved means for adjusting a catch on the housing door along a plurality of paths to correct any misalignment between the catch and an interlock member on the switch to permit cooperation between the catch and interlock member when the door is closed.

It is still another object of the invention to provide an electrical structure including a housing having a door and a control unit having a switch to be inserted and withdrawn into and out of the housing with novel and improved adjustable means for correcting any misalignment between an opening in the door and an extension of the switch to be received in the opening, and between a catch on the door and an interlock member on the switch.

In carrying out the invention in one preferred form a control center is provided including a housing having a door closing a compartment which contains a plurality of bus bars and a shelf which supports a control unit for sliding movement into and out of the compartment for connection to and disconnection from the bus bars. Aligning and locking means are provided to accurately align the unit with the bus bars and to lock the unit in position within the compartment. The control unit includes a switch having an interlock member, and also having a switch handle surrounded by an escutcheon ring which protrudes through an opening formed in the door when the unit is inserted. A positioning device is releasably mounted on the door for limited movement relative to the door in all directions in the plane of the door and mounts a catch on the inside of the door for additional adjustment in directions generally perpendicular to the plane of the door. The positioning device includes an opening which is smaller than and which communicates with the door opening and through which the switch escutcheon ring projects with clearance when the door is closed. If misalignment between the door opening and the escutcheon ring occurs when the door is closed, here the positioning device is adjusted in the plane of the door to bring the opening of the positioning device into symmetry with the escutcheon ring therein and to accurately position the catch relative to the interlock member in dimensions parallel to the plane of the door. If necessary, the catch is then adjusted perpendicular to the plane of the door to complete the proper positioning thereof relative to the interlock member.

Other objects and advantages of the invention will become apparent from the following description taken in conjunction with the accompanying drawings in which:

FIG. 4 is a view in perspective with parts broken away showing the interior of one compartment of the housing and showing a control unit positioned externally of the housing;

FIG. 7 is a plan view showing parts of the positioning device of FIG. 5.

Figure 1:
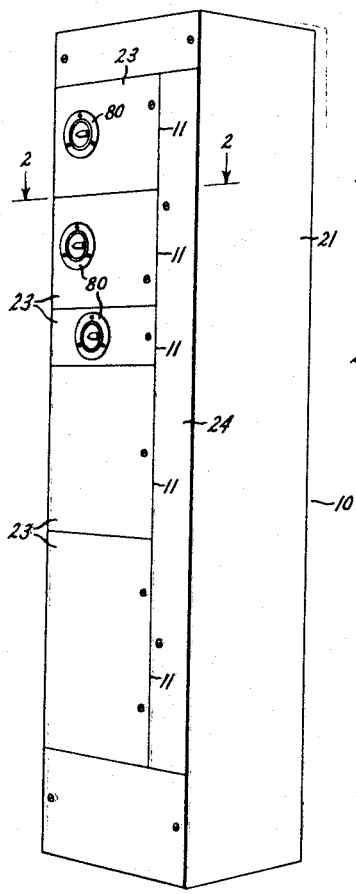
FIG. 1 is a view in perspective of a compartmented electrical structure showing portions of the housing thereof.

Referring now to the drawings the electrical structure is shown in the form of a control center and comprises in general a stationary housing or cabinet 10 having a number of vertically disposed compartments 11 and a vertical busway 12 extending substantially the full height of the housing 10 and passing through each of the compartments 11. A plurality of apparatus units or control units 13, only one of which is shown, are adapted to be inserted and withdrawn into and out of the compartments 11 for electrical plug-in connection to and disconnection from the busway 12, and the control units 13 when inserted are supported on vertically spaced horizontal shelves 14 within the housing which divide the housing into the several compartments. Each unit 13 includes one or more electrical control devices 15 and 15A and line and load contact terminal blocks 16 and 17 connected to the devices 15 and 15A, and adapted to be electrically connected respectively to the bus bars and to a load contact block 18 mounted in the associated compartment and connected to a suitable load device, such as a motor.

Figure 2:
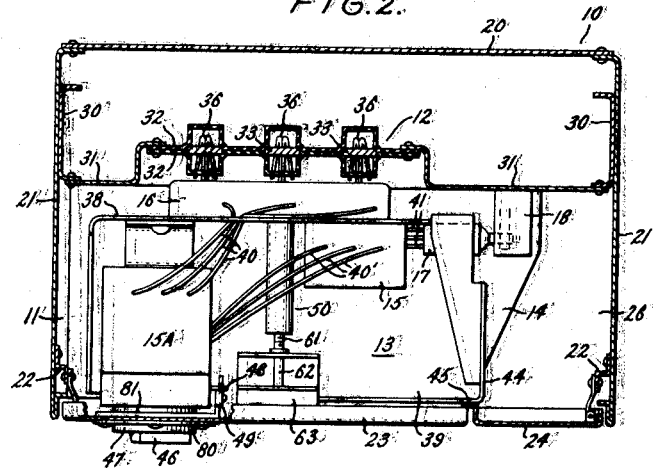
FIG. 2 is a view with parts shown in section taken along the line 2—2 of FIG. 1.

More specifically, the housing 10 includes a rear panel 20 (FIG. 2) formed of a suitable sheet metal and extending the full height of the housing between top and bottom panels (not shown). The panel 20 is intermediate and is connected as by rivets or screws to a pair of spaced parallel side panels 21 which mount at their front edges brackets 22 to which are hinged doors 23 and 24 which are swingable about vertical axes to conceal and expose the interior of the housing. A plurality of individual unit doors 23 are provided each for association with a separate one of the compartments 11, whereas a single trough door 24 extends substantially the full height of the housing 10 and is provided for concealing and exposing a wiring trough 26 which extends uninterrupted substantially the full height of the housing to accommodate load conductors leading from the load contact blocks 18. In FIGURES 1 and 2 of the doors 23 and 24 are shown in closed conditions wherein the doors are in a common plane at the front of the housing, and in FIGURE 3 two doors 23 and the door 24 are shown open to expose the interior of two compartments 11 and the trough 26 to permit access thereto through front openings of the housing. Each of the doors 23 includes a circular opening 27 (FIG. 5) and a plurality of angularly spaced, radially elongated slots 28 communicating with the opening 27 for a purpose appearing hereinafter. In the illustrated embodiment three slots 28 are provided and are spaced equally about the periphery of the opening 27.

Figure 3:
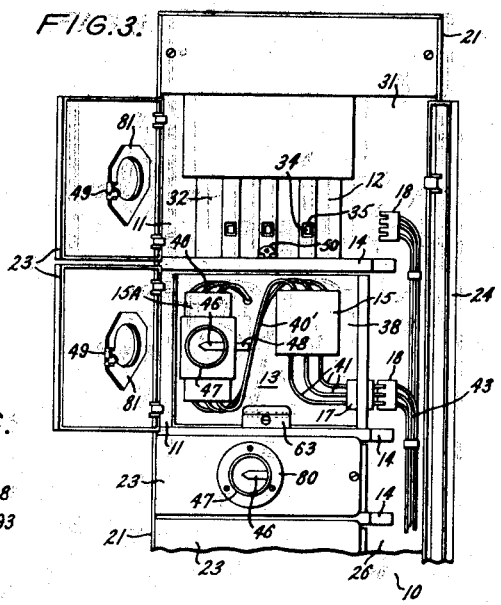
FIG. 3 is a view in front elevation with parts broken away showing the interior of the housing and showing a control unit mounted within the housing.

In order to support the busway 12 a pair of channel-shaped members 30 are secured to the side panels 21 at areas adjacent the rear of the housing as shown in FIG. 2 and extend substantially the full height of the housing. A pair of vertically extending generally Z-shaped mounting plates or brackets 31 are secured to the forwardly positioned flanges of the members 30 and mount therebetween at their rearwardly offset coplanar ends the insulation for the busway 12 which comprises a pair of identically configured insulating parts 32 each of which preferably is an integral unit extending substantially the full height of the housing. The insulating parts 32 are shown in FIG. 2 as having three vertically extending horizontally spaced recesses or channels and are mounted in face-to-face opposing relation to provide three composite pockets in which are retained three bus bars 33 of a three phase system which extend vertically substantially the full height of the housing. Further details of such insulation arrangement are shown and described in U.S. Patent 3,096,131 assigned to the assignee of the present invention. As shown in FIG. 3, the bars 33 include plug-in openings 34 horizontally aligned in each compartment and vertically aligned along the busway to receive stab contacts 36 (FIG. 2) carried by the block 16 and which project through plug-in openings 35 in the insulation member 32 located adjacent the block 16 and aligned with the openings 34.

As best shown in FIG. 4 the control unit 13 includes a mounting plate or saddle 37 of generally L-shaped configuration having a vertically extending rear wall 38 which supports at its rear surface the block 16 (FIG. 2), and a horizontally extending base 39 connected to the wall 38 and which is adapted for sliding engagement with the shelf 14 of a selected compartment when the control unit is inserted. The device 15, which may comprise a motor starter or other protective device, and the device 15A, which comprises a manually actuatable switch, are both mounted on the forward surface of the wall 38. The device 15A is connected to the stab contacts 36 by conductors 40 and conductors 40' connect the device 15A to the device 15 which in turn is connected to the load terminal block 17 by conductors 41 (FIGS. 2 and 3). The block 17 is also mounted on the forward surface of the wall 38 and includes a plurality of laterally extending vertically spaced contacts 42 adapted to engage contacts (not shown) of the associated load block 18 conveniently supported on the right-hand bracket 31 as viewed in FIG. 2. A plurality of load terminal blocks 18 are mounted in the housing in vertical alignment each adjacent a separate compartment and the trough 26, and load conductors 43 (FIG. 3) extending from all the blocks 18 are contained within the trough 26 and lead to suitable load devices, such as motors. As shown in FIGS. 2 and 4 the saddle 37 includes a side wall 44 which, when the unit is inserted, forms a barrier between the associated compartment and the trough 26, and which has a vertically extending front portion 45 serving as a stop against which the associated door 23 and the door 24 are adapted to close.

Figure 5:
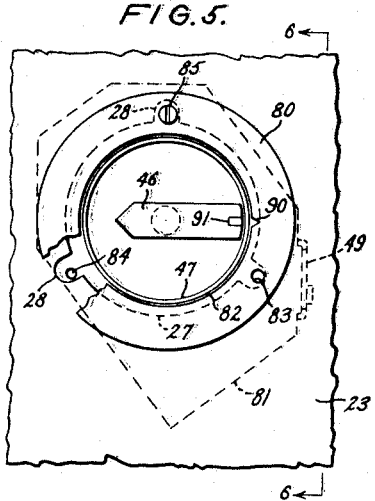
FIG. 5 is an enlarged view in front elevation of a portion of the housing door showing in particular the positioning device, the switch handle and the escutcheon ring.

The switch 15A includes a manually actuatable handle 46 which is surrounded by a circular shield or escutcheon ring 47 and which is rotatable to "on" and "off" positions for respectively energizing and deenergizing the device 15. The handle 46 is shown in FIGS. 3 and 5 in the "off" position and the ring 47 and handle 46 constitute an extension of the switch 15A which projects through the opening 27 of the door 23 when the door is closed so that the handle is accessible to an operator when the door is closed. Switch 15A also includes an interlock arm 48 movable downwardly as viewed in FIG. 3 in response to actuation of handle 46 to the "on" position for latchingly engaging a catch 49 mounted on the inside of the door 23 to latch the door closed when switch 15A is "on." When the handle 46 is rotated to the "off" position, arm 48 moves upwardly to the position shown to disengage the catch 49 and permit opening of the door 23.

Aligning and guiding means are provided for accurately aligning the control unit with respect to the bus bars and for guiding the control unit into the housing so as to assure rapid and positive engagement of the contacts 36 with the bus bars 33. For this purpose guide means are provided in the housing and on the control unit for interfitting engagement during insertion of the control unit into a selected compartment. A plurality of similar guide means in the housing are provided each for a separate compartment and one such guide means is illustrated in the form of an elongated metallic or insulating guide bar 50 (FIGS. 2 and 4) detachably secured to the upper surface of the associated shelf 14 to extend from front to rear in the housing. The guide means on the control unit is best shown on FIG. 4 and constitutes an opening 52 in the lower portion of the rear wall 38 of the saddle having a curved wall and communicating with a slot 53 formed in the base 39 of the saddle and extending from the opening 52 toward the front of the saddle.

The configuration of the guide bar 50 is also best shown in FIG. 4 and is of generally T-shaped configuration in a vertical cross section including an enlarged upper curved portion 54 having a curvature conforming to that of the opening 52, and a restricted lower portion 55 defining shoulders 56 which are vertically spaced from the upper surface of the shelf 14. When the control unit 13 is inserted into the housing, the enlarged upper portion 54 of the guide bar enters the opening 52 of the saddle and the restricted portion 55 enters the slot 53 so that the shoulders 56 of the guide bar overlie parts of the saddle base 39. With such arrangement, substantial movement of the unit 13 relative to the housing is prevented in directions perpendicular to the path of guidance of the unit.

In order to effect proper alignment between the guide bar 50 and the plug-in openings 35 of the insulation member 32, the guide bar 50 has associated therewith a central extension 57 (FIG. 4) which projects rearwardly from the bar 50 into a slot 58 formed in the forward insulation member 32 beneath and vertically aligned with the center one of the openings 35. It is understood that a plurality of vertically aligned slots 58 are formed in the busway each associated with a separate compartment. The extension 57 may comprise an integral part of the guide bar 50 and be formed of a metallic or an insulating material, or if desired, the extension 57 may constitute a separate part which is attached to the guide bar 50 and to the saddle base in any suitable manner. The extension 57 serves to accurately locate the guide bar 50 and the shelf 14 with respect to the busway 12 so that the control unit 13, when inserted, may be accurately guided into positive engagement with the bus bars.

In order to facilitate insertion and withdrawal of the control unit into and out of a selected compartment, and to positively lock the control unit within the compartment, locking means are provided which preferably include the guide bar 50 and an actuatable part on the control unit engageable with the guide bar 50 after partial insertion of the control unit. As shown in FIG. 4, the locking means includes an elongated threaded opening 60 formed centrally in the upper enlarged portion 54 of the guide bar 50 and extending from the front surface of the guide bar toward the rear thereof. The opening 60 is adapted to threadably receive the threaded end 61 of a screw 62 rotatably carried by a generally U-shaped bracket 63 mounted on the forward end of the base 39 of the saddle 37. The bracket 63 includes a rearwardly projecting handle portion 67 which an operator may grasp to facilitate insertion of the control unit. The screw 62 includes a slotted headed portion 68 for receiving a screw driver for rotating the screw.

In order to position the control unit within a selected compartment an operator grasps the handle 67 of the bracket 63 and lifts the control unit onto the shelf 14 with the opening 52 in alignment with the guide bar 50. The control unit is then moved into the housing manually such that the guide bar 50 is received within the opening 52 and the slot 53 until the tip of the threaded end 61 of the screw 62 engages the threaded opening 60. In order to complete insertion of the control unit the operator effects rotation of the screw 62 into the threaded opening 60 which results in movement of the control unit with respect to the guide bar 50 into the housing until the end wall of the slot 53 engages the front surface of the bar 50. When this occurs the stab contacts 36 have entered the openings 35 of the insulation member 32 and the openings 34 of the bus bars 33. The control unit 13 is now rigidly locked in operative position within the compartment and can be removed therefrom only by rotation of the screw 62 in the reverse direction. Further details of the guiding and locking means are set forth in the aforementioned Olashaw application and need not be described herein.

In control structures of the type described problems are encountered in obtaining proper alignment between the opening 27 of the door and the escutcheon ring 47 of the switch to be received in the opening, and between a part on the door, such as the catch 49, and a part on the control unit, such as the interlock arm 48, to assure proper engagement of the catch and interlock arm when the door is closed and the switch is turned "on." The arm 48 and the catch 49 are also referred to herein respectively as first and second parts. Such problems are particularly troublesome in control centers which incorporate unit aligning and locking means such as previously described herein. In previous designs the door catch, corresponding to catch 49, is generally fixed to the inside surface of the door in predetermined position relative to the door opening. With this arrangement and with means which operates to predetermine the position of the control unit and the switch in space relative to the bus bars, it can be appreciated that due to tolerance accumulations, the door opening may be misaligned with respect to the escutcheon ring which results in the door catch being misaligned with respect to the switch interlock arm. The door opening is ordinarily made somewhat larger than the escutcheon ring to assure reception of the ring within the door opening. However, this leads to an unsightly appearance, especially if the door opening is misaligned and eccentrically positioned with respect to the ring when the door is closed. It can be appreciated that misalignment between the door catch and the interlock arm can result in failure of these parts to engage or to properly engage, when the door is closed and the switch turned "on."

Figure 6:
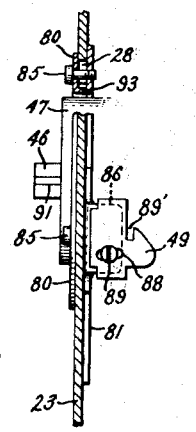
FIG. 6 is a view taken along the line 6—6 of FIG. 5.

According to the present invention, positioning means are releasably mounted on the door for adjustment in a plurality of different directions to permit alignment between the ring 47 and the door opening 27 and also to permit proper relative positioning between the door catch and the interlock arm. In the preferred form the positioning means constitutes a pair of members 80 and 81 having openings 82 of substantially the same size which are somewhat smaller than the opening 27 of the door 23. The members 80 and 81 are adapted to be positioned on opposite sides of the door 23 with the member 80 on the outside of the door and with the member 81 on the inside thereof as best shown in FIGS. 5 and 6. The outside member 80 includes a plurality of angularly spaced openings 83 adapted to align with the slots 28 of the door 23 and also with a plurality of angularly spaced openings 84 of the inside member 81 which are threaded to receive threaded screws 85 which extend through the openings 83 and the slots 28.

As best shown in FIGS. 6 and 7 the inside member 81 includes an arm 86 bent out of the plane of the member 81 at substantially a right angle thereto and having a threaded opening 87. The catch 49 is adjustably secured to the arm 86 and comprises a plate having inturned flanges which extend about the edges of the arm 86, an elongated slot 88 to receive a screw 89 which passes through the threaded opening 87 in the arm 86, and a notch 89' to receive the interlock arm 48. With this arrangement, when the screw 89 is loose, the catch 49 may be adjusted with respect to the member 81 in opposite directions generally perpendicular to the plane of the member 81 so that when the members 80 and 81 are operatively secured to the door, the catch 49 may be positioned relative to the interlock arm 48 to permit entry of the arm 48 into the notch 89' when the door is closed. The member 80 includes a mark 90 at the periphery of the opening 82 and the mark 90 has a predetermined location with respect to the catch 49 when the members 80 and 81 are operatively mounted on the door. With this arrangement, adjustment of the members 80 and 81 to a position wherein the mark 90 is aligned with a mark 91 on the handle 46 of the switch when the switch is "off"

moves the catch 49 into proper position relative to the arm 48 in dimensions parallel to the plane of the door.

The positioning members 80 and 81 are assembled by positioning them respectively at the outside and inside of the door about the opening 27 with the openings 83 and 84 of the members in alignment with each other and with the elongated slots 28 of the door. Screws 85 are then inserted in the openings 83 and 84 to pass through the slots 28 and are slightly tightened so as to permit adjustment of the members 80 and 81 as a unit relative to the door opening. The door 23 is then closed, so that the escutcheon ring 47 and handle 46 project through the door opening 27 and the openings 82 of the positioning members. If the shield 47 is eccentrically related to the opening 27, the members 80 and 81 are adjusted as a unit in the plane of the door to effect alignment between the openings 82 and the shield 47. Such adjustment of the members 80 and 81 is limited by engagement of the screws 85 with the walls of the slots 28. At the same time, the members 80 and 81 are adjusted so that the mark 90 aligns with the mark 91 which properly positions the catch 49 relative to the interlock arm 48 in the dimensions parallel to the plane of the door. If the interlock arm 48 does not enter the notch 89' of the catch 49 when the door is closed and the switch is turned to the "on" position, the catch 49 can be adjusted in directions perpendicular to the plane of the door to assure proper engagement of the notch 89' of the catch and the interlock arm. The member 80 is provided with an annular flange 93 which projects from the inner surface thereof and surrounds the opening 82 and which engages the outer surface of the member 81 when the two members are mounted on the door. With such arrangement the side walls of the opening 27 of the door are not visible externally of the door.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. An electrical structure comprising, a housing having a front opening, a plurality of bus bars in the housing, a unit to be inserted and withdrawn through the front opening into and out of the housing for connection to and disconnection from said bus bars, means predetermining the position of the unit relative to the bus bars when the unit is inserted, a door mounted on the housing to open and close the front opening, a first part on said unit to be positioned inside the housing adjacent said front opening when the unit is inserted, and a second part adjustably mounted on the door for cooperation with said first part when the unit is inserted and the door is closed, said second part being mounted for limited adjustment in the plane of the door and also in directions generally perpendicular to the plane of the door.

2. An electrical structure comprising, a housing having a front opening, a plurality of bus bars in the housing, a unit to be inserted and withdrawn through the front opening into and out of the housing for connection to and disconnection from said bus bars, means predetermining the position of the unit relative to the bus bars when the unit is inserted, a door mounted on the housing to open and close the front opening, a first part on said unit to be positioned inside the housing adjacent said front opening when the unit is inserted, positioning means mounted on the door for limited adjustment in all directions in the plane of the door, and a second part for cooperation with said first part when the unit is inserted and the door is closed, said second part being mounted on the inside of the door by the positioning means for adjustment therewith in the plane of the door and for independent adjustment relative thereto in directions generally perpendicular to the plane of the door.

3. An electrical structure comprising, a housing having a front opening, a plurality of bus bars in the housing, a unit to be inserted and withdrawn through the front opening into and out of the housing for connection to and disconnection from said bus bars, means predetermining the position of the unit relative to the bus bars when the unit is inserted, a door having a first opening and mounted on the housing to open and close said front opening, a switch on the unit having an interlock member to be positioned adjacent the front opening when the unit is inserted and having an actuating handle to extend through the first opening when the door is closed, positioning means adjustably mounted on the door and having a second opening smaller than and communicating with the first opening to receive the handle when the door is closed, said positioning means being mounted for limited adjustment in the plane of the door to move the second opening into a desired position relative to the switch handle, and a catch for cooperation with the interlock member mounted on the inside of the door by the positioning means for adjustment therewith in the plane of the door and for independent adjustment relative thereto in directions generally perpendicular to the plane of the door.

4. A structure as defined in claim 3 wherein said positioning means comprises a pair of members secured together on opposite sides of the door and having aligned openings defining said second opening, said catch being adjustably mounted by the member on the inside of the door.

5. An electrical structure comprising, a housing having a front opening, a plurality of bus bars in the housing, a unit to be inserted and withdrawn through the front opening into and out of the housing for connection to and disconnection from said bus bars, means predetermining the position of the unit relative to the bus bars when the unit is inserted, a door mounted on the housing to open and close said front opening, said door having a first opening and a plurality of spaced radially elongated slots communicating with the first opening, a switch on the unit having an interlock member to be positioned adjacent the front opening when the unit is inserted, said switch also having an operating handle adapted to project through the first opening when the unit is inserted and the door is closed, a pair of positioning members on opposite sides of the door having aligned second openings smaller than and in communication with the first opening to receive said handle when the door is closed, fastening means attaching said positioning members and extending through said elongated slots to releasably secure said positioning members to said door for limited adjustment as a unit in all directions in the plane of the door, and a latch for cooperation with said interlock member mounted by the positioning member on the inside of the door for adjustment with said positioning members in the plane of the door and for independent adjustment relative to the positioning members in directions generally perpendicular to the plane of the door.

6. A structure as defined in claim 5 wherein said handle and the positioning member at the outside of the door include markings capable of alignment when the positioning members are adjusted in the plane of the door, the marking on the handle having a predetermined position with respect to the interlock member and the marking on the positioning member having a predetermined position with respect to the catch.

7. An electrical structure comprising, a housing having a front opening, a plurality of bus bars in the housing, a unit to be inserted and withdrawn through the front opening into and out of the housing for connection to and disconnection from said bus bars, means predetermining the position of the unit relative to the bus bars when the unit is inserted, a door mounted on the housing to open and close said front opening, said door having a first circular opening and a plurality of spaced radially elongated slots communicating with the first opening, a switch on the unit having an interlock member to be positioned adjacent the front opening when the unit is inserted, said switch also having an extension which includes an operating handle and an escutcheon ring surrounding the handle adapted to project through the first opening when the unit is inserted and the door is closed, a pair of positioning members on opposite sides of the door having aligned second circular openings smaller than and in communication with the first opening to receive with clearance said escutcheon ring when the door is closed, fastening means attaching said positioning members and extending through said elongated slots to releasably secure said positioning members to said door for limited adjustment as a unit in all directions in the plane of the door, and a latch for cooperation with said interlock member mounted by the positioning member on the inside of the door for adjustment with said positioning members in the plane of the door and for independent adjustment relative to the positioning members in directions generally perpendicular to the plane of the door.

8. A structure as defined in claim 7 wherein said extension and the positioning member at the outside of the door include markings capable of alignment when the positioning members are adjusted in the plane of the door, the marking on the handle having a predetermined position with respect to the interlock member and the marking on the positioning member having a predetermined position with respect to the catch.

9. A structure as defined in claim 7 wherein the positioning member at the outside of the door includes a flange surrounding its second opening and engaging the positioning member at the inside of the door.

References Cited in the file of this patent
UNITED STATES PATENTS

| | | |
|---|---|---|
| 2,762,879 | Wills | Sept. 11, 1956 |
| 2,883,483 | Horn | Apr. 21, 1959 |
| 3,005,064 | Baird et al. | Oct. 17, 1961 |
| 3,066,244 | Defandorf et al. | Nov. 27, 1962 |